United States Patent
Shivanna et al.

(10) Patent No.: US 10,496,495 B2
(45) Date of Patent: Dec. 3, 2019

(54) ON DEMAND REMOTE DIAGNOSTICS FOR HARDWARE COMPONENT FAILURE AND DISK DRIVE DATA RECOVERY USING EMBEDDED STORAGE MEDIA

(71) Applicant: Hewlett Packard Enterprise Development LP, Houston, TX (US)

(72) Inventors: Suhas Shivanna, Bangalore (IN); Sandeep Bangalore Harshavardhana, Bangalore (IN); Raghunandan Chikkaramaiah, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/305,239

(22) PCT Filed: Apr. 30, 2014

(86) PCT No.: PCT/IN2014/000292
§ 371 (c)(1),
(2) Date: Oct. 19, 2016

(87) PCT Pub. No.: WO2015/166510
PCT Pub. Date: Nov. 5, 2015

(65) Prior Publication Data
US 2017/0046233 A1 Feb. 16, 2017

(51) Int. Cl.
*G06F 11/00* (2006.01)
*G06F 11/14* (2006.01)
*G06F 11/07* (2006.01)

(52) U.S. Cl.
CPC ........ *G06F 11/1469* (2013.01); *G06F 11/006* (2013.01); *G06F 11/079* (2013.01);
(Continued)

(58) Field of Classification Search
CPC ............ G06F 11/0751; G06F 11/0766; G06F 11/0769; G06F 11/0784; G06F 11/08; G06F 11/14
(Continued)

(56) References Cited

U.S. PATENT DOCUMENTS

| 5,673,382 A | 9/1997 | Cannon et al. |
| 7,487,343 B1 | 2/2009 | Insley et al. |

(Continued)

FOREIGN PATENT DOCUMENTS

| CN | 102033795 | 4/2011 |
| CN | 102722425 | 10/2012 |

(Continued)

OTHER PUBLICATIONS

International Searching Authority, The International Search Report and the Written Opinion, PCT/IN2014/000292, dated Feb. 2, 2015, 11 Pgs.
(Continued)

*Primary Examiner* — Sarai E Butler
(74) *Attorney, Agent, or Firm* — Hewlett Packard Enterprise Patent Department (57) ABSTRACT

Techniques for on-demand remote diagnostics for hardware component/device failure and disk drive data recovery using embedded media are described. In one example embodiment, a hardware device failure event alert along with a unique ID and a hardware device configuration fingerprint is sent upon detecting a hardware component failure event associated with the hardware device in a datacenter to an image management framework. A recovery image associated with the hardware device failure event is then obtained using the unique ID and the hardware device configuration fingerprint. The recovery image is then stored in an embedded storage media associated with the failed hardware (Continued)

device. The embedded storage media is then configured as a bootable hardware device. The hardware component failure is then diagnosed using the stored recovery image and the bootable hardware device upon hardware device boot-up. Recovering from the hardware device failure based on diagnosing the hardware component failure.

19 Claims, 3 Drawing Sheets

(52) U.S. Cl.
CPC ...... *G06F 11/0748* (2013.01); *G06F 11/0793* (2013.01); *G06F 11/1451* (2013.01); *G06F 11/1464* (2013.01); *G06F 2201/805* (2013.01); *G06F 2201/82* (2013.01); *G06F 2201/83* (2013.01); *G06F 2201/84* (2013.01)

(58) Field of Classification Search
USPC .................................. 714/19, 48, 47.1, 2, 25
See application file for complete search history.

(56) References Cited

U.S. PATENT DOCUMENTS

| | | | |
|---|---|---|---|
| 7,640,458 | B2 | 12/2009 | Rao et al. |
| 8,639,966 | B2 | 1/2014 | Bensinger |
| 2004/0111490 | A1 | 6/2004 | Im et al. |
| 2008/0148286 | A1 | 6/2008 | Hetrick |
| 2013/0326260 | A1 | 12/2013 | Wei et al. |
| 2014/0380089 | A1* | 12/2014 | Kim .................... G06F 11/1484 714/6.3 |
| 2015/0220411 | A1* | 8/2015 | Shivanna ............ G06F 11/2289 714/19 |

FOREIGN PATENT DOCUMENTS

| | | |
|---|---|---|
| CN | 103246280 | 8/2013 |
| EP | 0978785 | 2/2000 |

OTHER PUBLICATIONS

Kroll Ontrack, " Ontrack Data Recovery Service", available online at <https://web.archive.org/web/20151021100631/http://www.krollontrack.com/data-recovery/data-recovery-process/remote-data-recovery/>, Oct. 21, 2015, 2 pages.

Reiner, "The facts about remote data recovery", available online at <http://www.computerworld.com/s/article/101218/The_facts_about_remote_data_recovery?taxonomyId=083>, Apr. 26, 2005, 5 pages.

* cited by examiner

ON DEMAND REMOTE DIAGNOSTICS FOR HARDWARE COMPONENT FAILURE AND DISK DRIVE DATA RECOVERY USING EMBEDDED STORAGE MEDIA

BACKGROUND

One of the major responsibilities of a system administrator in a datacenter is remote data recovery upon disk drive and operating system failures. Current data recovery techniques from failed disk drives can be manually intensive. In some cases data recovery operation includes one or more of visiting the datacenter, selecting recovery media, reconfiguration of the hardware device to boot up using selected recovery media and so on. This data recovery operation can become even more complicated in a heterogeneous datacenter having multiple operating systems, file systems and vendor devices.

Another one of the major responsibilities of a system administrator in datacenters is remote diagnostics of complex hardware component failures that may be isolated to a single field replaceable unit (FRU). For example, in hyper scale environments with tens of thousands of servers, reliability and availability is built into the application layer, making a single or multiple node failures a non concern from an application availability perspective. In normal scenarios, when a hardware component fails, diagnostic software may be run on the hardware component/device to detect any potential failures and the hardware component may be either replaced or reimaged completely before placing the device back in operation in a cluster. However, in non-hyper scale environments and mission critical environments, it may be necessary to perform root cause analysis to determine the nature of hardware component failure before initiating a failback operation. Due to the complexity of hardware component designs and nature of hardware component failures, it may not be possible to accurately diagnose the nature of hardware component failures to single FRU using tools shipped with a hardware device. In such situations, remote diagnostic tools may have to be launched and run in an offline mode to determine the nature of the hardware component failure. For mission critical operations, this can be very time consuming and can significantly increase application downtime.

DETAILED DESCRIPTION

In the following description and figures, some example implementations of systems and/or methods for on-demand remote diagnostics for hardware component failure and disk drive data recovery using embedded storage media are described. Various examples described below relate to on-demand remote diagnostics for hardware component failure and disk drive data recovery, i.e., to automatically run the diagnostic tools upon a hardware component failure and diagnose and recover from the hardware component failure. Further examples described below relate to using a combination of predictive failure events, configuration finger print, recovery image repository, and embedded storage for enabling an automated end-to-end solution for hardware component failure and disk drive data recovery in datacenters.

More specifically examples describe using an image management subsystem which holds recovery images (bootable) for disk drive recovery and hardware component validation tools. The recovery image repository contains recovery images indexed using a combination of hardware architecture, Operating System (OS), file system and failure events. The indexes designed using configuration information assists in fine granular management of different images and further assist in reducing downloadable image size. The management subsystem is configured to monitor various types of hardware component failures and diagnostic events and send out alerts and predictive failure events with unique identifiers (IDs). These unique IDs along with hardware architecture and operating system (OS) types can be used to automatically retrieve the appropriate recovery image from the image management subsystem. The retrieved recovery image is flashed to the embedded NAND storage and configured as a bootable hardware device. When a hardware device, for example, a server is booted with the recovery image, based on the design of the recovery image, it may first collect any needed information to diagnose and then recover the data from disk drive failures. For hardware component validation scenarios, the appropriate hardware component validation tool can be automatically run to perform root cause analysis on the hardware component failures and report out to the fault monitoring station using the management subsystem. For disk failures, the recovered data is stored in the recovered image repository and is then tagged with the serial number/User identification (ID)/Disk identifier (ID) and this recovered data may then be used to update the backup automatically using backup software. In addition, the examples described below integrates vendor specific data recovery tools to work in both offline (i.e., non-bootable) and online (i.e., bootable) states. The automated process reduces data loss due to human error while recovering the operating system (OS) data. Further using configurable recovery policies and the on demand nature of the diagnostic and recovery process assist in meeting both hyper scale and enterprise hardware reliability requirements. Moreover, the example techniques describe an automated lights out hardware diagnostic and data recovery using a combination of predictive failure events, hardware device configuration fingerprint to select the recovery image and dynamically download the recovery image to the embedded storage in a failed hardware device.

The terms "disk drive", "disc drive", "hard drive", "hard disk" and "disk" are used interchangeably throughout the document. Further, the terms "hardware", and "hardware device" are being used interchangeably throughout the document.

Figure 1A:
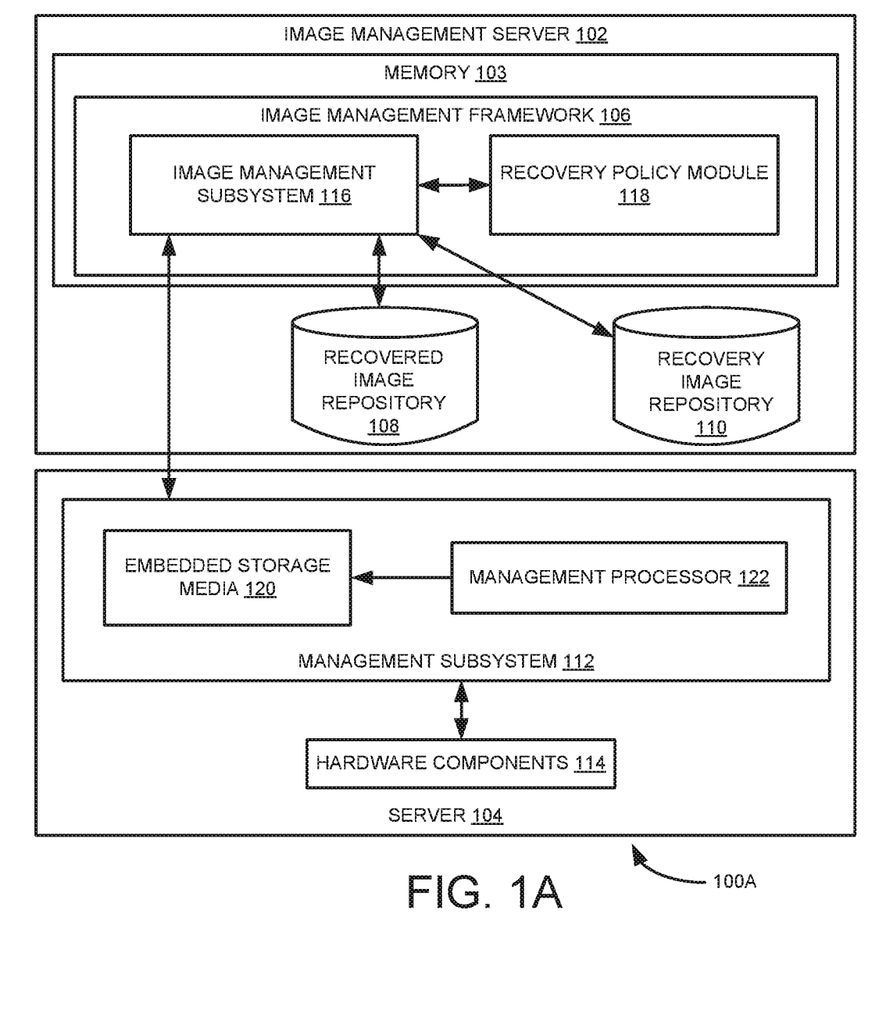
FIG. 1A is a block diagram depicting example on-demand remote diagnostics architecture for hardware component failure using embedded media and disk drive data recovery using embedded storage media.

FIG. 1A is a block diagram 100A depicting an example scenario of on demand remote diagnostics architecture for hardware component failure and disk drive data recovery using embedded storage media 120. Referring to FIG. 1A, the example system 100A depicts an image management server 102 that is communicatively coupled to a server 104 in a datacenter. As depicted in FIG. 1A, the image management server 102 includes an image management framework 106 that is residing in memory 103. Further as depicted in FIG. 1A, the image management framework 106 includes an image management subsystem 116 that is communicatively coupled to a recovery policy module 118. Also as shown in FIG. 1A, the image management server 102 includes a recovered image repository 108 and a recovery image repository 110 that are communicatively coupled to the image management subsystem 116. Further as shown in FIG. 1A, the server 104 includes a management subsystem 112 and hardware components 114. Furthermore as shown in FIG. 1A, the management subsystem 112 includes the embedded storage media 120 and a management processor 122.

Figure 1B:
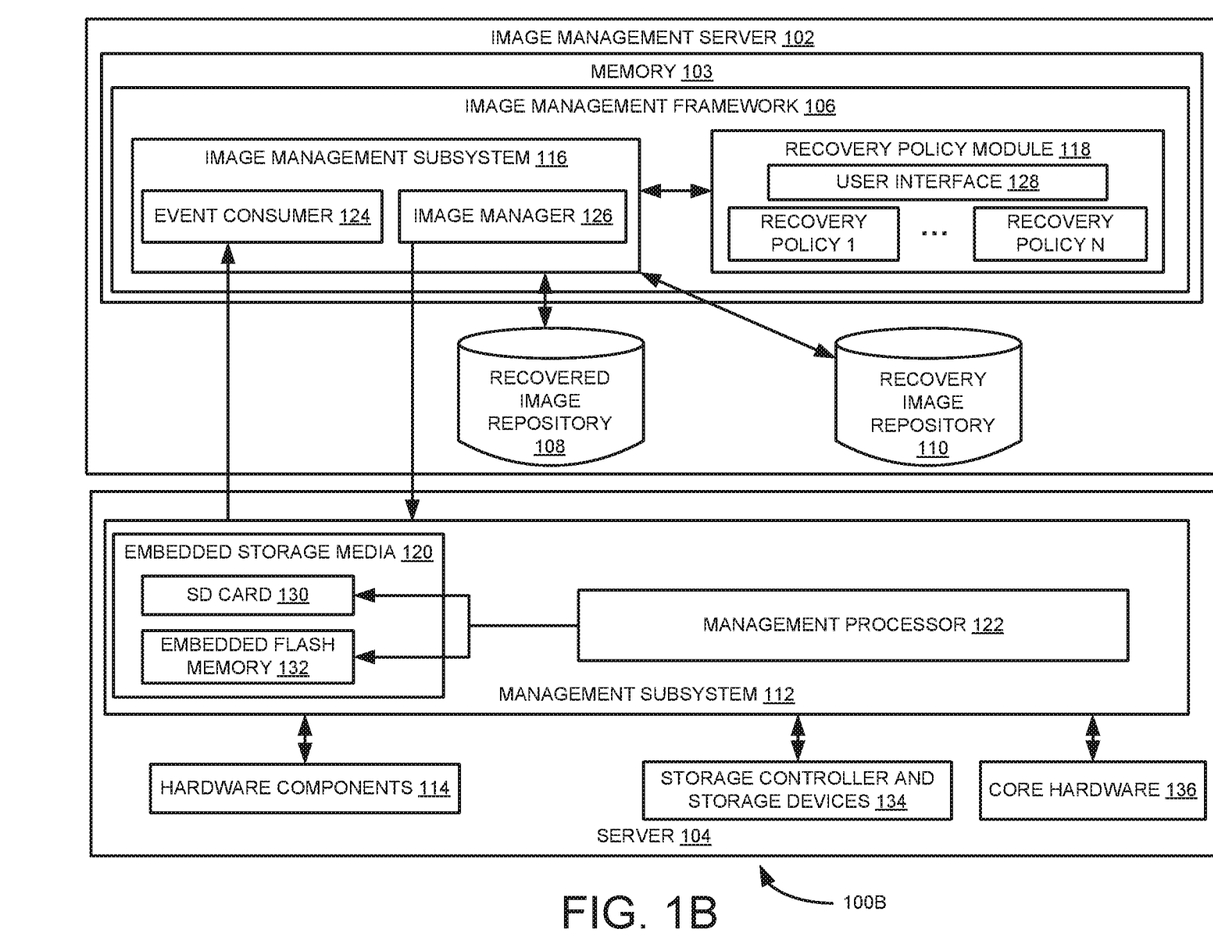
FIG. 1B is another block diagram depicting example on-demand remote diagnostics architecture for hardware component failure using embedded media and disk drive data recovery using embedded storage media.

FIG. 1B is a block diagram 100B that is similar to FIG. 1A except the recovery policy module 118 is shown including a user interface 128 that is configured to create recovery policies 1-N. Further as shown in FIG. 1B, the image management subsystem 116 includes an event consumer 124 and an image manager 126 that are communicatively coupled to the management subsystem 112. Furthermore as shown in FIG. 1B, the management subsystem 112 includes a storage controller and storage devices 134, and core hardware 136 that are communicatively coupled to the management subsystem 112. Moreover as shown in FIG. 1B, the embedded storage media 120 can be an SD card 130 and/or an embedded flash memory 132 that are coupled to the management processor 122.

In operation, a hardware device failure event alert along with a unique ID and a hardware device configuration fingerprint is sent to the event consumer 124 upon detecting a hardware component failure event associated with the hardware device in the datacenter by the management subsystem 112. The terms "hardware" and "hardware device" are used interchangeably to identify computer systems and associated components, such as telecommunications and storage systems housed in a data center. Example hardware and/or hardware device is the server 104, storage arrays and the like. Further, the term "hardware components" is used to identify components inside a hardware/hardware device and is controlled by the corresponding management subsystem. Example hardware components 114 include motherboard, processor, memory, embedded disk drives inside hardware device like server, networking components, video cards, power supply, fan and the like. In some examples, hardware device configuration fingerprint includes hardware configuration and health parameters, such as operating system type (for example, Linux®, Windows™ and so on) and version, type of hardware device architecture (for example, x86™, ARM™ and so on), type of file system (for example, Ext3 (file system extension in Linux), (New Technology File System) NTFS and so on) and the like. In these examples, the hardware device failure event is associated with a failed hardware component event, about to fail hardware component event and/or a failing hardware component event in the hardware device. In some examples, the event consumer 124 is configured to receive diagnostic warning and predictive failure events from disk drive controllers and self monitoring analysis and reporting technology (SMART) disk drives. Further in some examples, the event consumer 124 is configured to receive predictive hardware device failure event alerts from hardware components 114 of the server 104, such as fans, power supply, central processing unit (CPU) and so on. Furthermore in some examples, the management subsystem 112 is configured to generate predictive failure and warning event alerts including unique IDs by interfacing with hardware components 114, such as storage controllers and system hardware. Also for SMART disk drives and solid state drives (SSDs), the management subsystem 112 may be configured to retrieve SMART diagnostics statistics and warning events using sideband interface and may be further configured to generate associated predictive failure event alerts with unique IDs and send them to event consumer 124.

In some examples, the image management subsystem 116 is configured to obtain hardware device configuration fingerprints of all the hardware devices, in the datacenter. Further, all the hardware devices in the datacenter are registered for predictive hardware component failure events with the management subsystem 112. Furthermore, each hardware device in the datacenter is periodically scanned for the hardware failure events.

The image manager 126 then obtains a recovery image associated with the hardware device failure event from the recovery image repository 110 using the unique ID and the hardware device configuration fingerprint. Example recovery image includes disk recovery and diagnostic tools. The image manager 126 then sends the obtained recovery image to the management subsystem 112. The management subsystem 112 then stores the obtained recovery image in the embedded storage media 120. Example embedded storage media are the embedded flash memory 132 and the SD card 130. The management subsystem 112 then configures the embedded storage media 120 as a bootable recovery image. In some examples, the image manager 126 indexes bootable recovery images for hardware component 114 and disk drive recovery based on hardware device configuration and health parameters. Example hardware device configuration and health parameters are operating system (OS) type and version, type of hardware device architecture, type of file system, type of failure that can facilitate granular management of recovery images and to further reduce downloaded recovery image size and the like. The image manager 126 then stores the indexed bootable recovery images in the recovery image repository 110. Using failure event ID (i.e., the unique ID) while indexing bootable recovery images assists in recovery image management by reducing the size of the bootable image as only the needed diagnostic tools for handing a specific type of failure need to be embedded in the recovery image.

For example, if a memory subsystem failure is identified with a unique system event, such as "0001" requiring the need to run advanced memory diagnostics, then a recovery image with memory subsystem validation tool is indexed using the unique ID, system architecture and/or OS. However, if hardware device failure event alerts are not conclusive, a generic recovery image is selected for running pre-configured scripts containing commands that a normal system administrator may first run using vendor provided diagnostic tools to detect and recover from hardware component failures and then proceed to run system recovery tools. In some examples, the image management subsystem 116 includes a repository of recovered images that are generated after running the recovery/diagnostic tools on failed/unhealthy disk drives.

The management processor 122 then assists in diagnosing the hardware component failure in the hardware device using the recovery image and the embedded storage media upon hardware device boot-up. The management processor 122 then assists in recovering from the hardware device failure based on the hardware component failure diagnosis. Example hardware device in the datacenter is the server 104. The image management subsystem 116 then stores any recovered image in the recovered image repository 108. In some examples, a partitionable embedded storage media, such as a partitionable embedded flash storage is used to dynamically download and mount recovery bootable images for diagnostics and data recovery from failed/corrupted disk drives. In these examples, a network component may be configured to provide a secure interface (for example, https) for downloading recovery images to the embedded storage media 120, such as NAND flash storage and also provide needed support to set appropriate server parameters to boot from the recovery image (for example, boot path variables). In these examples, the predictive events also include applicable hardware device configuration and health parameters, such as hardware device architecture, type of OS and file system to assist the image management subsystem 116 to automatically or based on recovery policies to download the recovery image to the embedded NAND flash storage. In these examples, the OS boots up with the recovery image including vendor tools to diagnose hardware component and disk drive failures and appropriately recover data.

In some examples, hardware device configuration fingerprints of each hardware device, such as the server 104, in the datacenter is obtained by the image management framework 106. The image management framework 106 then registers with each hardware device in the datacenter using associated management subsystem 112 for predictive hardware device failure events. The management subsystem 112 associated with each hardware device in the datacenter then periodically scans hardware components for failure events.

In some examples, needed information for recovering from the hardware device failure is collected by the management processor 122. The management processor 122 then determines from the collected information whether the failed hardware device is a disk drive. The management processor 122 then collects the data from the failed disk drive if the failed device is a disk drive. The management processor 122 then stores the recovered data along with failed disk drive id in the recovered image repository 108. Example disk drive ids are serial number, user ID and/or disk ID. The management processor 122 then assists in recovering from the disk drive failure by using the recovered data. In the case of disk drive failures, the management processor 122 starts backing up the data to a centralized image management framework 106. In these examples, the centralized image management framework 106 creates the recovered image and tags with appropriate server IDs. Further in these examples, the recovered image is tagged using unique hardware component/device IDs, such as serial number and universally unique identifier (UUID). Also in these examples, the image management framework 106 can be part of central management software or may be hosted in dedicated environment, such as those shown in FIGS. 1A and 1B.

In these examples, the management processor 122 runs an associated hardware component validation tool to root cause the hardware component failure if the failed hardware component 114 is not a disk drive. Then the management processor 122 reports out the reason for the hardware component failure, places the failed hardware component for maintenance, and/or recovers from the hardware component failure by activating available redundant components.

In some examples, the image management framework 106 allows an IT administrator to configure one or more recovery policies 1-N for hardware devices, such as the server 104 in the datacenter using the user interface 128. In these examples, the management subsystem 112 via the management processor 122 via the image management subsystem 116 recovers from any hardware device failure after diagnosing the hardware device failure using the associated configured recovery policy from the image management server 102. In these examples, the image management subsystem 116 supports policy based restoration of the configured incremental back data for the disk drive using vendor provided backup/restore software. Further, based on recovery policies 1-N, the recovered image may be mounted on a different managed servers and continue the operation of the server 104 without any operational interruption.

The working of the above example technique is explained below using a server failing to boot because of storage hardware failure, such as disk drive.

For example, an automated management processor typically provides a mechanism to detect whether a server has successfully booted or not If management processor detects a failed boot-up, then the management processor sends out a service/hardware device failure event alert to a centralized image management subsystem 116 and the centralized image management subsystem 116 then acknowledges that the server has failed to boot. The centralized image management subsystem 116 then sends out a message to the management processor to start the recovery process for the failed server. The management processor, upon receiving such a message, powers off the server. The centralized image management subsystem 116 then uses the configuration of the failed server along with the service event and user defined policies to select a recovery image from a recovery image repository 110, such as those shown in FIG. 1. The centralized image management subsystem 116 then transfers the selected recovery image onto the server's embedded storage media 120 and sets appropriate boot-up parameters. The management processor then powers on the server and boot-up the server using the stored recovery image. When the customized OS boot-up from the recovery image, the customized OS performs needed recovery mechanisms if the file system is corrupted. The customized OS then will start backing up the data residing in the failed server to the centralized image management subsystem 116. The centralized image management subsystem 116 then creates a specific recovered image from the obtained data from the management processor and restores backups for the server using vendor provided backup software. One skilled in the art can see from the above example, that the technique provides an automated lights-out hardware device diagnostic and disk drive data recovery using a combination of predictive failure events and configuration fingerprint. The needed recovery image is dynamically obtained and downloaded to the embedded storage media 120 of the failed hardware device. Further, the embedded device is configured as a bootable hardware device, which enables the failed hardware device to recover by booting-up using the recovery image.

In one example, the executable instructions can be part of an installation package that when installed can be executed by the image management framework 102 to implement the system 100. In that example, the memory resource in the system 100 can also be a portable medium such as a CD, a DVD, a flash drive, or memory maintained by a computer device from which the installation package can be downloaded and installed. In another example, the executable instructions can be part of an application or applications already installed. Here, the memory resource in the system 100 can include integrated memory such as a drive, NVRAM, DRAM or the like.

In the discussion herein, the image management framework 106 in FIG. 1 has been described as a combination of circuitry and executable instructions. Such components can be implemented in a number of fashions. The executable instruction can be processor executable instructions, such as program instructions, stored on memory, such as the memory 103 and embedded storage media 120, which is a tangible, non-transitory computer readable storage medium, and the circuitry can be electronic circuitry, the image management server 102 and the server 104, for executing those instructions. The servers 102 and 104, for example, can include one or multiple processors. The memory 103 and the embedded storage media 120 can store program instructions, which enable demand remote diagnostics for hardware component failure and disk drive data recovery as a result of code generated by the image management subsystem 116 and/or the recovery policy module 118. The memory 103 can be integrated in the same server 102 or it can be in a separate computing system that is accessible to the server 102.

As shown in FIG. 1, the image management subsystem 116 including the event consumer 124 and the image manager 126 and the recovery policy module 118 can be stored in a same computing system or distributed across servers, other devices or storage mediums, or a combination thereof. For example, an instance of the image management subsystem 116 and recovery policy module 118 can be executing on each one of the processor resources of the server devices. The engines and/or modules can complete or assist completion of operations performed in describing another engine and/or module. The engines, drivers and/or modules can perform the example methods described in connection with FIG. 2.

Figure 2:
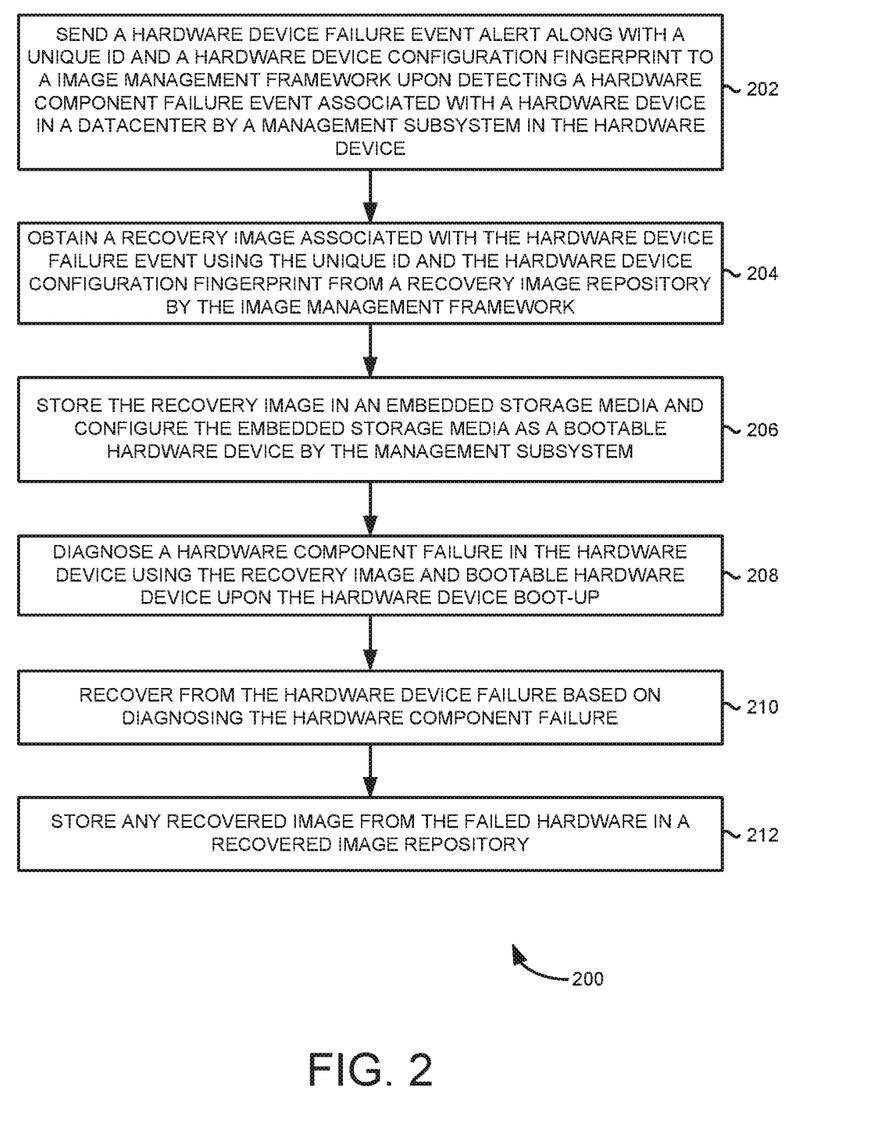
FIG. 2 is a flow diagram depicting an example method for on-demand remote diagnostics for hardware component failure and disk drive data recovery using embedded storage media.

FIG. 2 is a flow diagram 200 depicting an example method for on demand remote diagnostics for hardware component/device failure and disk drive data recovery in a datacenter. Referring to FIG. 2, example methods for implementing on demand remote diagnostics for hardware component/device failure and disk drive recovery in the datacenter.

At block 202, a hardware device failure event alert along with a unique ID and a hardware device configuration fingerprint is sent to an image management framework upon detecting a hardware component failure event associated with a hardware device by a management subsystem in the hardware device in the datacenter. At block 204, a recovery image associated with the hardware device failure event is obtained using the unique ID and the hardware device configuration fingerprint from a recovery image repository by the image management framework. At block 206, the recovery image is stored in an embedded storage media and the embedded storage is configured as a bootable hardware device by the management subsystem. At block 208, upon the hardware boot-up, the hardware component failure associated with the hardware device is diagnosed using the bootable hardware device and the recovery image. At block 210, recovery action will be taken on the hardware component based on diagnosis of the hardware component failure. At block 212, any recovered image from the failed hardware device is stored in a recovered image repository.

The above examples describe an automated remote hardware device diagnostics and data recovery technique that uses a combination of image management framework, manageability processor, embedded flash storage and manageability firmware without external storage devices, such as compact disc read-only-memory (CDROM) and external universal serial bus (USB) devices. Further the above examples describe using management processor enabled storage, without the need for external media, and integrate recovery image management, predictive failure events, SMART diagnostics and automated image recovery tools to provide an end-to-end automated and holistic hardware components and disk drive data recovery technique.

The method associated with the flow diagram 200 of FIG. 2 is explained in more detail with reference to FIGS. 1A and 1B above. Although the flow diagram of FIG. 2 illustrates specific orders of execution, the order of execution can differ from that which is illustrated. For example, the order of execution of the blocks can be scrambled relative to the order shown. Also, the blocks shown in succession can be executed concurrently or with partial concurrence. All such variations are within the scope of the present subject matter. Even though the above FIGS. 1A, 1B, and 2 are described using the hardware components 114 and the management subsystem 112 associated with one server 104 in the datacenter, one skilled in the art would appreciate that the idea can be extended any number of servers in a datacenter.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the subject matter that is defined in the following claims.

What is claimed is:

1. A system comprising: an image management server, comprising: an image management subsystem; and a recovery policy module coupled to the image management subsystem; a server coupled to the image management subsystem, wherein the server comprises: an image management framework including the image management server and the image management subsystem and a management subsystem, wherein the management subsystem and the image management framework are to: send an alert for a hardware device failure event; obtain a recovery image associated with the hardware device failure event; send the obtained recovery image to the management subsystem; and diagnose and recover from the hardware device failure event in a hardware device using the recovery image upon a hardware device boot-up.

2. The system of claim 1, wherein the management subsystem comprises: a management processor; and an embedded storage media that is coupled to the management processor, wherein the management subsystem and the image management framework are to diagnose and recover from the hardware device failure event in the hardware device using the recovery image upon the hardware device boot-up, comprising the steps of: storing the obtained recovery image in the embedded storage media and configuring the embedded storage media as a bootable hardware device by the management subsystem; and diagnosing and recovering from the hardware device failure event in the hardware device using the recovery image and bootable hardware device upon the hardware device boot-up by the management processor.

3. The system of claim 2, wherein the management subsystem and the image management framework are further configured to: send the alert for the hardware device failure event along with a unique identifier (ID) and a hardware device configuration fingerprint to the image management subsystem upon detecting a hardware component failure event associated with a hardware device in a data center by the management subsystem in the hardware device; obtain obtaining the recovery image associated with the hardware device failure event from the recovery image repository using the unique ID and the hardware device configuration fingerprint by the image management subsystem; obtain obtaining hardware device configuration fingerprints of each hardware device in the data center by the image management framework; register registering each hardware component in the hardware device for predictive hardware device failure events with the management subsystem; and periodically scan scanning hardware components associated with each hardware device in the data center for the predictive hardware device failure events by the image management framework.

4. The system of claim 3, wherein the management subsystem and the image management framework are to recover from a hardware component failure based on diagnosing the hardware component failure, comprises the steps of: collecting needed information for recovering from the hardware component failure; determining whether the failed hardware component is a disk drive; if so, recovering data from the failed disk drive; storing recovered data and a failed disk drive ID in the recovered image repository; recovering from the disk drive failure by using the recovered data; if not, running an associated hardware component validation tool to perform root cause analysis on the hardware component failure; and reporting a reason for the hardware component failure, placing the failed hardware component for maintenance, or recovering from the hardware component failure by taking the failed hardware component offline and adding a redundant component.

5. The system of claim 1, wherein the image management server further comprises: a recovered image repository and a recovery image repository, wherein the management subsystem and the image management framework are further to: index bootable recovery images for hardware component and disk drive recovery based on hardware device configuration and health parameters selected from a group consisting of operating system type and version, type of hardware architecture, type of file system, and type of failure to facilitate granular management of recovery images and to further reduce downloaded recovery image size; and store the indexed bootable recovery images in the recovery image repository.

6. The system of claim 3, wherein the image management framework indexes bootable recovery images based on hardware device configuration and operating system type and version.

7. The system of claim 1, wherein the recovery policy module comprises a comprise an user interface and wherein the management subsystem and the image management framework are further to: allow to configure a recovery policy to automatically download a recovery image and recovery actions for each hardware device in the data center using the user interface in the recovery policy module; and recover from any hardware device failure event based on diagnosing the hardware component failure and an associated configured recovery policy using the image management server.

8. A non-transitory computer readable storage medium comprising a set of instructions executable by at least one processor resource to: send a hardware device failure event alert along with a unique ID and a hardware device configuration fingerprint upon detecting a hardware component failure event associated with a hardware component in a server by a management subsystem in a hardware device in a datacenter; obtain a recovery image associated with the hardware device failure event using the unique ID and the hardware device configuration fingerprint; store the recovery image in an embedded storage media associated with the management subsystem and configuring the embedded storage media as a bootable hardware device by the management subsystem; and diagnose a hardware component failure in the hardware device using the recovery image and the bootable hardware device upon a hardware device boot-up.

9. The non-transitory computer readable storage medium of claim 8, further to: recover from the hardware device failure event based on diagnosing the hardware component failure; and store any recovered image associated with the failed hardware device in a recovered image repository.

10. The non-transitory computer readable storage medium of claim 8, wherein the hardware component failure event is associated with a failed hardware component event, about to fail hardware component event and/or a failing hardware component event.

11. The medium of claim 8, wherein the recovery images indexed based upon operating system type and version.

12. A method, comprising: sending a hardware device failure event alert along with a unique ID and a hardware device configuration fingerprint to a image management framework upon detecting a hardware component failure event associated with a hardware device in a datacenter by a management subsystem in the hardware device; obtaining a recovery image associated with the hardware component failure event using the unique ID and the hardware device configuration fingerprint from a recovery image repository by the image management framework; storing the recovery image in an embedded storage media and configuring the embedded storage media as a bootable hardware device by the management subsystem; and diagnosing a hardware component failure in the hardware device using the recovery image and bootable hardware device upon the hardware device boot-up.

13. The method of claim 12, further comprising: recovering from the hardware component failure based on diagnosing the hardware component failure; and storing any recovered image from the failed hardware device in a recovered image repository.

14. The method of claim 12, wherein the hardware component failure event is associated with a failed hardware component event, about to fail hardware component event and/or a failing hardware component event.

15. The method of claim 12, further comprising: indexing bootable recovery images for hardware components and disk drive recovery based on hardware device configuration and health parameters selected from a group consisting of operating system type and version, type of hardware architecture, type of file system, and type of failure to facilitate granular management of recovery images and to further reduce downloaded recovery image size; and storing the indexed bootable recovery images in the recovery image repository.

16. The method of claim 15, wherein the bootable recovery images are indexed based upon operating system type and version.

17. The method of claim 12, further comprising: obtaining hardware device configuration fingerprints of each hardware device in the datacenter; registering each hardware components for predictive hardware failure events with the management subsystem; and periodically scanning all the hardware components in each hardware device in the datacenter for the hardware component failure events by the image management framework.

18. The method of claim 12, wherein recovering from the hardware component failure based on diagnosing the hardware component failure, comprises: collecting needed information for recovering from the hardware device failure; determining whether the failed hardware device is a disk drive; if so, recovering data from the failed disk drive; storing the recovered data along with failed disk drive id in a recovered image repository; recovering from the disk drive failure by using the recovered data; if not, running an associated hardware component validation tool to perform root cause analysis on the failed hardware component; and reporting a reason for the hardware device failure, placing the failed hardware device for maintenance, or recovering from the hardware device failure by taking the failed hardware device offline and replacing it with a redundant hardware device.

19. The method of claim 12, further comprising: allowing to configure a recovery policy for each hardware device in the datacenter; and recovering from any hardware device failure based on diagnosing the hardware device failure and an associated configured recovery policy.

* * * * *